United States Patent [19]
Snyder et al.

[11] Patent Number: 5,143,184
[45] Date of Patent: Sep. 1, 1992

[54] CARBON COMPOSITE BRAKE DISC WITH POSITIVE VIBRATION DAMPING

[75] Inventors: David R. Snyder, Stow, Ohio; Lawrence E. McAllister, Granger; Jaring V. Veen, South Bend, both of Ind.

[73] Assignee: Allied-Signal Inc., Morristown, N.J.

[21] Appl. No.: 655,000

[22] Filed: Feb. 14, 1991

[51] Int. Cl.⁵ ............................................. F16D 65/10
[52] U.S. Cl. .................... 188/218 XL; 188/218 A; 188/73.37
[58] Field of Search ........ 188/218 XL, 218 R, 218 A, 188/73.2, 73.37, 73.35, 73.36, 71.5; 74/574; 192/107 R

[56] References Cited

U.S. PATENT DOCUMENTS

| | | | |
|---|---|---|---|
| 2,551,253 | 5/1951 | Du Bois | 188/72 |
| 2,650,796 | 9/1953 | Abraham | 255/19 |
| 2,706,018 | 4/1955 | Du Bois | 188/72 |
| 2,893,519 | 7/1959 | Martin | 188/71 |
| 2,925,889 | 2/1960 | Albright | 188/18 |
| 2,934,174 | 4/1960 | Luciern | 188/73 |
| 2,955,677 | 10/1960 | Jones | 188/18 |
| 3,357,519 | 12/1967 | Anderson et al. | 188/18 |
| 3,378,115 | 4/1968 | Stephens | 188/218 A |
| 3,435,935 | 4/1969 | Warman | 188/218 XL |
| 3,480,115 | 11/1969 | Lallement | 188/72 |
| 3,494,452 | 2/1970 | Finkin | 192/70.14 |
| 3,498,418 | 3/1970 | Dewar | 188/72 |
| 3,509,973 | 5/1970 | Kimata | 188/218 |
| 3,548,979 | 12/1970 | Nelson | 188/218 XL |
| 3,575,270 | 4/1971 | Wagenfahrer | 188/218 A |
| 3,613,851 | 10/1971 | Ely et al. | 192/107 |
| 3,800,392 | 4/1974 | Cook et al. | 29/401 |
| 3,891,066 | 6/1975 | Anderson | 188/73.2 |
| 3,895,693 | 7/1975 | Lucien et al. | 188/71.1 |
| 3,918,555 | 11/1975 | Rath | 188/73.37 |
| 3,932,568 | 1/1976 | Watts et al. | 264/29 |
| 3,937,303 | 2/1976 | Allen et al. | 188/218 XL |
| 3,948,363 | 4/1976 | Ely | 188/71.1 |
| 4,072,219 | 2/1978 | Hohm et al. | 188/218 XL |
| 4,154,322 | 5/1979 | Yamamoto | 188/73.37 |
| 4,585,096 | 4/1986 | Bok | 188/73.37 |
| 4,825,983 | 5/1989 | Nakanishi | 188/218 A |
| 4,848,521 | 7/1989 | Izamine | 188/218 XL |
| 4,865,167 | 9/1989 | Giorgotti | 188/218 XL |

FOREIGN PATENT DOCUMENTS

| | | |
|---|---|---|
| 0020389 | 7/1983 | European Pat. Off. . |
| 2658427 | 12/1987 | Fed. Rep. of Germany . |

Primary Examiner—Joseph F. Peters, Jr.
Assistant Examiner—Christopher P. Ellis
Attorney, Agent, or Firm—Larry J. Palguta; Leo H. McCormick; Robert A. Walsh

[57] ABSTRACT

A carbon composite aircraft brake disc (10, 50, 60, 110, 120) is manufactured to include internally an insert member (12, 14, 18, 24, 28, 32, 36, 42, 52, 115, 125) which effects positive vibration damping for the disc (10, 50, 60, 110, 120) during operation of the brake (100). The insert member (12, 14, 18, 24, 28, 32, 36, 42, 52, 115, 125) may be a graphite material, paper, or cloth material which is introduced into the interior of material utilized for manufacturing the carbon composite aircraft disc (10, 50, 60, 110, 120). After manufacturing of the brake disc (10, 50, 60, 110, 120) is completed, the brake disc comprises a single integral carbon composite brake disc (10, 50, 60, 110, 120) having disposed completely internally therein the insert member which provides a discontinuity that effects efficiently positive vibration damping of the disc (10, 50, 60, 110, 120) during operation of the aircraft brake (100) in which the disc is located.

38 Claims, 3 Drawing Sheets

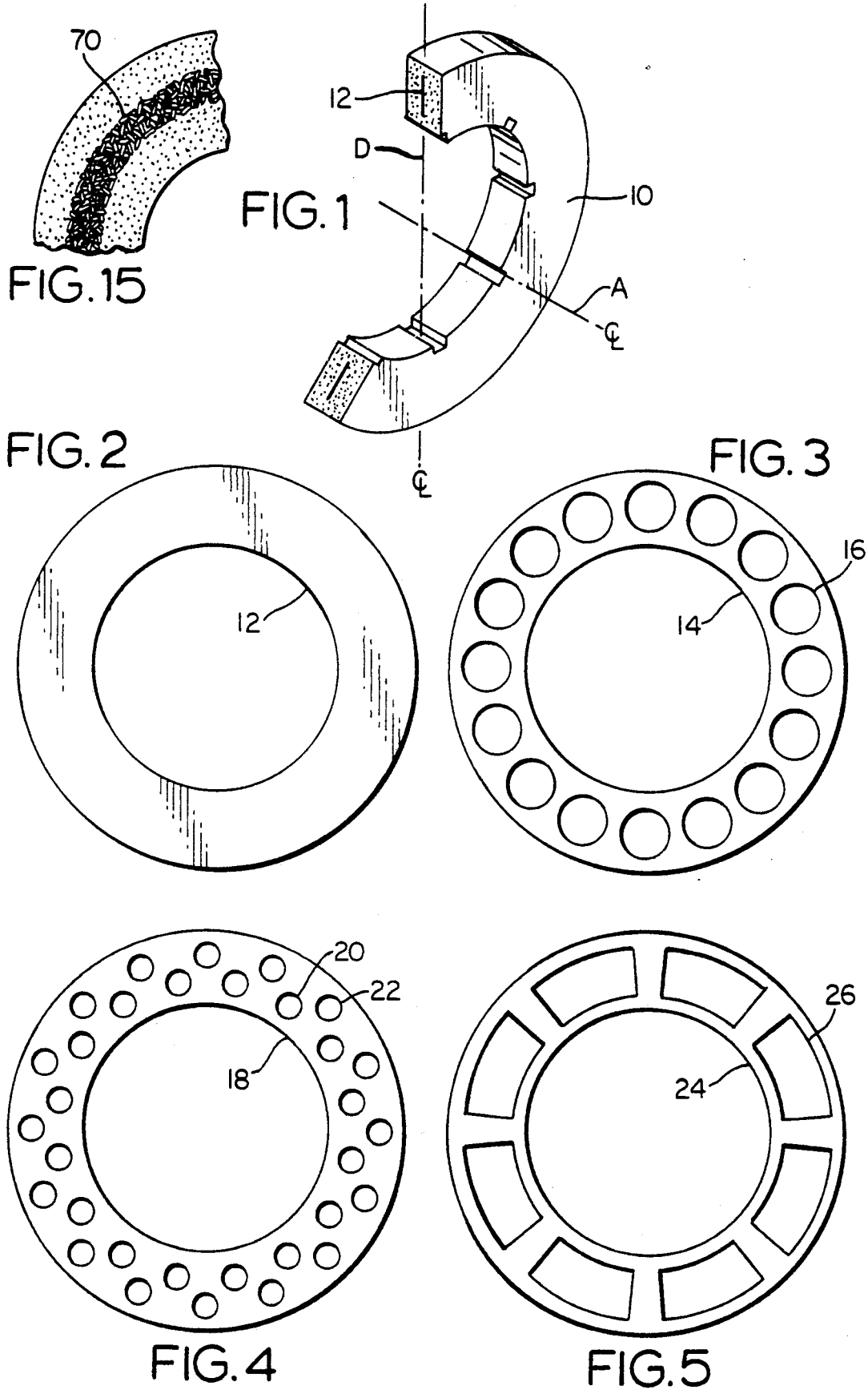

CARBON COMPOSITE BRAKE DISC WITH POSITIVE VIBRATION DAMPING

The present invention relates generally to aircraft brake discs, and in particular to carbon composite aircraft brake discs which provide positive vibration damping during operation of an aircraft brake.

BACKGROUND OF THE INVENTION

The use of carbon composite, brake discs within aircraft brakes is well known. Aircraft brakes which utilize carbon composite brake discs include both rotating and stationary carbon discs. The rotating carbon discs (rotors) and stationary carbon discs (stators) may be manufactured by the same or different processes. Certain carbon disc friction members may exhibit vibration properties which are undesirable. One form of undesirable vibration, commonly referred to as brake "squeal", may be excited or caused by what some believe to be "negative damping" generated by braking. Negative damping is usually associated with the partial derivative of the brake torque with respect to slip velocity ("negative slopes"). Brake squeal, in general terms, may be described as torsional oscillations of the stationary parts of the braking system. Typically, numerous squeal modes may be excited, with squeal modes of significance usually in the 150 to 10 KHz range. If squeal levels are high enough, damage can occur to brake discs and/or brake components. One way to eliminate undesirable vibration of the brake discs is to split each disc into two separate discs, and then locate the separated individual discs within the aircraft brake. European Patent No. 0 020 389 entitled "*Disc Brake Assembly Containing Split Discs*" discloses such a method. While the presence of such split discs can dampen or eliminate undesirable vibration, the use of split discs is generally less preferable than the use of brake discs each of which are single, integral discs. Split discs have a tendency to warp under high temperature conditions, and a drop in disc strength occurs due to splitting. U.S. application Ser. No. 4,585,096 discloses the use of a split disc with a separator disc located between the split discs. Again, the split disc/separator disc mechanism may eliminate undesirable vibration, but is less preferable than the utilization of integral, nonsplit carbon composite brake discs. One problem provided by split discs with separator members or thin foil separating sheet members disposed therebetween as disclosed by the above patents, is that a relatively gross motion between the separated discs leads to the degradation or wearing away of the separator disc/separating sheet member such that the separate disc or member may migrate from between the split discs and degrade substantially vibration dampening or prevention of the claimed melting/fusing together of the split discs.

SUMMARY OF THE INVENTION

The object of the present invention is to introduce positive damping into the brake system in order to substantially reduce or eliminate squeal vibration. It is desirable to accomplish this without the utilization of split discs, separator disc members, or separating sheet members previously utilized to dampen vibration, and prevent fusion. Those structures are avoided and the above problems are solved by providing a disc for a friction mechanism such as a brake or clutch, the disc having parallel faces for engagement with opposing faces of associated friction mechanism members, said disc comprising a single integral disc member made of carbon composite friction material which includes an internal insert member disposed completely internally of said disc member, the insert member effecting positive vibration damping of the disc member during operation of said friction mechanism.

BRIEF DESCRIPTION OF THE DRAWINGS

The following drawings illustrate embodiments of the present invention, in which:

FIG. 1 is a section view of a carbon composite brake disc made in accordance with the present invention;

FIG. 2 is an annular-shaped insert member;

FIG. 3 is an annular-shaped insert member including a plurality of circular openings;

FIG. 4 is an annular-shaped insert member including two radially spaced-apart rings of circular openings;

FIG. 5 is an annular-shaped insert member having a plurality of annularly spaced-apart segmented openings;

FIG. 15 is a partial section view taken in the plane of rotation of a carbon composite brake disc and illustrating a shredded damping insert member.

DESCRIPTION OF THE PREFERRED EMBODIMENTS

Figure 6:
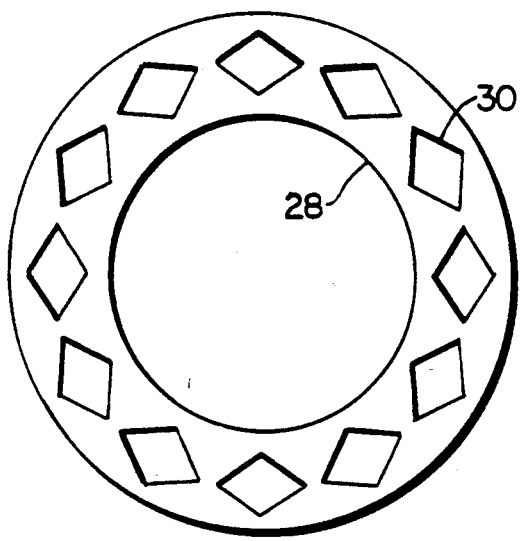
FIG. 6 is an annular-shaped insert member having therein a ring of diamond-shaped openings.

The object of the present invention is to introduce positive damping into the brake system in order to substantially reduce or eliminate squeal vibration without increasing adverse warpage or reducing the strength of brake components. The brake system may comprise an aircraft brake, a clutch, or any friction mechanism utilized to control the movement of one member of the mechanism relative to another member. This is accomplished by the integration into the disc (or discs) of rings or segments, in continuous, intermittent, shredded or other geometric piece forms of a temperature resistant or temperature resistant forming material which in the final disc form is believed by some to result in positive or hysteretic damping by the presence of the rings or segments and the interface created, when the disc is being stressed. Hysteretic damping can be defined as damping wherein internal work within the material results in the dissipation of energy. Disc stresses and deflections are multi-dimensional in nature due to the superposition of in-plane torsional, out-of-plane bending and axial deflections which occur due to localized actuation and axial reaction forces imposed during braking. The integral damping insert members of the present invention have been selected in order to take advantage of positive dampening mechanisms which reduce squeal vibrations in the brake system. Weak bonding between the damping insert member and the surrounding carbon fiber composite will promote positive damping under dynamic loading conditions. This can be accomplished by the use of a graphite material such as Grafoil ® that forms a poor surface bond due to the low cohesive strength of its graphite particulate structure. The damping inserts may be of single or multiple layers. FIG. 1 illustrates a section view of a carbon composite brake disc including a damping insert member in accordance with the present invention. Disc 10 is made of a carbon composite material, as described in further detail below, and includes therein a damping insert member 12 in the form of an annulus which provides a discontinuity within the carbon composite material. Although the discontinuity comprises the material of the damping insert member rather than a void, the effect of the insert member is to effect positive vibration damping of disc 10 during dynamic loading conditions such as the operation of a brake in which the disc is located. Multiple layers of the damping insert member 12 would provide additional surfaces for interacting and dampening squeal vibrations. The internal damping insert member 12 may be thin (for example, a single layer of 0.005 inch) such that interfacial damping is dominant, or thicker (for example, 0.02 inch) to increase hysteretic damping contribution. If a strong interfacial bond is achieved between the carbon composite and damping insert member, hysteretic damping would be a mechanism of vibration reduction.

U.S. application Ser. No. 4,585,096 discloses the use of a thin separator disc between split discs in order to suppress noise and vibration and enhance dissipation of heat. Because split disc members are utilized, there tends to be a gross motion between the disc members during operation of the associated brake such that the separator disc member may be worn away and then migrate or move away from between the split discs. Such a structure promotes the destruction of the separator disc. The utilization of an internal, damping insert member in accordance with the present invention eliminates such wearing away and destruction because, first, there does not exist any motion between two split discs since only a single integral disc is utilized. Second, the single integral disc with the internally disposed damping insert member promotes positive damping on a significantly different scale than exists when two split discs disposed about a separator disc is utilized. Third, the damping insert member is located entirely within the integral disc member so that it cannot migrate or move out of the disc member. EP-A-0 020 389 discloses the utilization of two split disc members in order to reduce noise and inhibit vibration. Interposed between the disc members is a separating sheet member of graphite foil or other similar material to prevent melting or welding together of the two disc members under the high temperatures and pressures of operation. Because of the movement of the two disc members relative one another during operation of the brake, the wear effects upon the separating sheet member could be even more devastating. Because the discs have an opening at the outer and inner diameters thereof, the separating sheet member is permitted to move or migrate outwardly away from the opposing interfaces of the disc members and lose its effectiveness. The damping insert members disclosed in accordance with the present invention are located entirely within the integral disc member so that they cannot migrate or move outwardly of the disc member.

Figure 7:
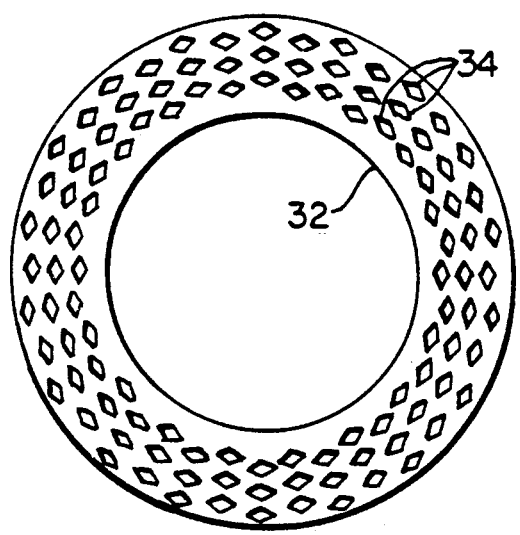
FIG. 7 is an annular-shaped insert member having therein a plurality of radially spaced-apart rings of diamond-shaped openings.
Figure 8:
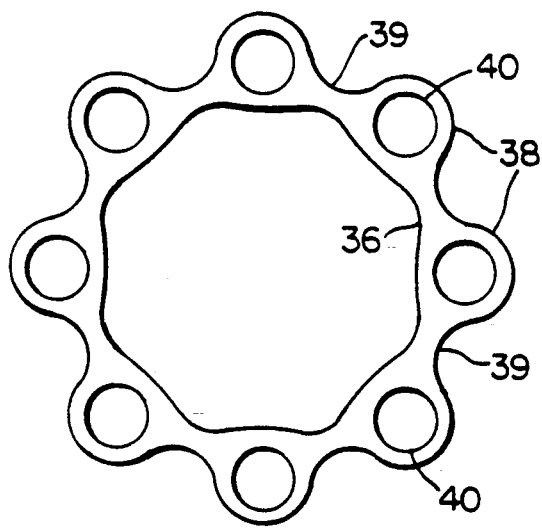
FIG. 8 is a generally annular-shaped insert member having an irregular-shaped perimeter and with a plurality of circular openings.
Figure 9:
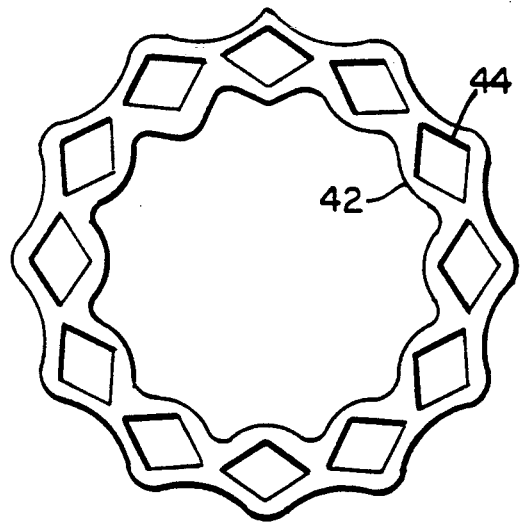
FIG. 9 is a generally annular-shaped insert member having an irregular shaped perimeter and with a plurality of diamond-shaped openings.

Embodiments of damping insert members utilizable within the present invention are illustrated in FIGS. 2-9. FIG. 2 illustrates the annular-shaped damping insert member 12 shown in FIG. 1. Member 12 comprises a continuous annular-shaped member which will effect discontinuities within the associated carbon composite brake disc. FIG. 3 illustrates an annular-shaped damping insert member 14 including a plurality of openings 16 in the form of circles. It is believed that the use of such openings in the damping insert member will provide improved disc integrity by effecting better continuity of the carbon composite material across or through the openings, and may affect positive damping. FIG. 4 illustrates an annular-shaped damping insert member 18 including therein two rings of radially spaced-apart circular openings 20 and 22 which are circumferentially offset relative to one another. FIG. 5 illustrates an annular-shaped damping insert member 24 having a plurality of angularly spaced-apart arcuate-shaped segments 26. FIG. 6 illustrates an annular-shaped damping insert member 28 having therein a ring of openings 30 which are diamond-shaped. FIG. 7 illustrates an annular-shaped damping insert member 32 having therein a plurality of radially spaced apart rings of diamond-shaped openings 34. FIG. 8 illustrates a generally annular-shaped damping insert member 36 having irregular or varying radial dimension portions 38, 39 wherein portions 38 include circular openings 40. FIG. 9 illustrates a generally annular-shaped damping insert member 42 with an irregular shaped perimeter and having therein a ring of diamond-shaped openings 44. The use of damping insert members which include openings, regular or irregular, segmented openings, or shredded (see FIG. 15) damping insert members 70 should increase the cross coupling strength of the carbon composite material within the disc and thus enhance the utilization of worn discs for reuse after overhaul. It is not essential that the damping insert member be planar when introduced during the manufacturing of a disc or when manufacturing is completed. Annular-shaped damping insert members are preferrable due to ease of handling.

Figure 10:
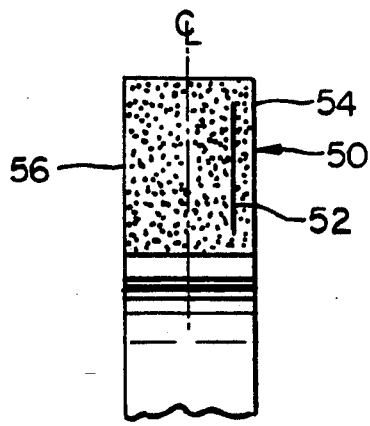
FIG. 10 is a partial section view of a carbon composite brake disc having therein an insert member located offset from the diametral center line of the disc.
Figure 11:
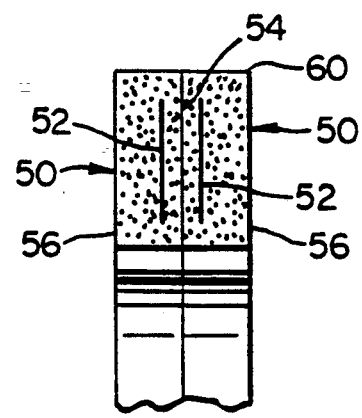
FIG. 11 is an illustration of two worn carbon composite discs, such as that illustrated in FIG. 10, after refurbishment via a two-for-one refurbishment method.

The utilization of damping insert members in accordance with the present invention provides a number of significant advantages over prior vibration damping methods such as split discs, split discs sandwiched about a separator disc member, and split discs with a separating sheet member. The positive damping insert member of the present invention is an integral part of the brake disc. Thus, the resulting disc is not split or layered. Full structural capability of each disc is maintained. Because the invention provides internal damping effected by including the damping insert member(s) within the carbon composite during processing, the damping insert member(s) become an integral internal component of a one-piece carbon composite disc. The localized interfacial strength between a damping insert member (or damping insert members) and carbon composite material can be controlled in order to achieve the desired degree of positive damping. Likewise, hysteretic damping can be controlled by variation in damping insert member volume, composition and microstructure. The integral nature of the carbon composite disc prevents half-disc warpage that can occur in split discs utilized previously. Finally, the integral nature of the disc will permit a two-for-one brake disc refurbishment without reprocessing. Such cannot be easily accomplished if the disc were initially split as previously described. Referring to FIG. 10, there is illustrated in partial section view a carbon composite brake disc 50 which includes a damping insert member 52 that is offset from the diametral center line of disc 50. It should be clearly understood that damping insert member 52 can be located along the diametral center line (as illustrated by center line D in FIG. 1) or it can be offset any distance from the diametral center line of the disc. It is important that damping insert member 52 be located a sufficient distance from an axial friction face 54, 56 of disc 50 so that during wear or usage the friction surface will not wear down to the point that the damping insert member is at the friction surface and would be worn away or disintegrated. A two-for-one disc refurbishment method would utilize disc 50 with insert member 52 such that one friction face 56 of disc 50 would be designated as a future friction face in the two-for-one refurbishment process. After disc 50 has been worn, two such worn discs 50 are coupled together to form a refurbished disc member 60 wherein each friction face 56 is disposed axially outwardly for engagement with an adjacent disc and the damping insert members 52 are located axially inwardly adjacent faces 54. Thus, refurbished brake disc 60 provides at each friction face 56 the maximum amount of axial depth of composite material for wear during use in an associated brake.

A carbon composite brake disc utilizing a damping insert member in accordance with the present invention may be manufactured by several methods. Described below are three exemplary methods for manufacturing such a brake disc. A first manufacturing method comprises the use of molded random carbon fiber to provide a composite brake disc. A carbon composite brake disc has been prepared by incorporating a damping insert member into a preform which was subsequently compression molded and processed into a one-piece brake disc. A number of such brake discs comprising stator and rotor friction components were manufactured. The following is a summary of the process steps of the manufacturing method. First, a quantity of chopped carbon fiber/phenolic molding compound required to fabricate a brake disc preform is divided into two portions. The two portions may be either equal or unequal, depending on where it is desired for the damping insert member to be disposed axially within the preform and resulting disc. One portion of the molding compound is uniformly added to a preform die. Then the damping insert member, in this case a graphite annulus of Grafoil®, was placed in the preform die on the surface of the molding compound. The annular damping insert member can vary in its inner diameter, outer diameter, thickness and number of layers. However, it must have a smaller outer diameter than the preform and a larger inner diameter than the preform. Additionally, it should be generally centered with respect to the axial center line of the preform (see axial center line A of FIG. 1). Alternatively, an annular insert may be effected by adding damping insert material in the form of shredded foil or other geometric piece forms such as circles, rectangles, triangles, etc. Then the second portion of the molding compound is added to the preform die. Next, the preform is formed by application of heat and by compression of the preform in the axial direction. The resulting preform is then used to form a molded carbon/phenolic disc by a compression molding process (heat and pressure). The resulting molded disc contains the damping insert member as an integral part of its structure. Next, the molded disc is processed into a carbon-carbon aircraft brake disc by a series of process steps including carbonization to convert the phenolic to carbon, densification by chemical vapor deposition (CVD) into a porous structure, and heat treatment (1600°-2800° C.) to produce a carbon or graphite of the desired crystal structure. The carbon material is then machined to final dimensions. Numerous variations of the basic carbonization and densification steps may be utilized. Alternatively, the CVD process can be replaced by multiple cycles of char-forming liquid impregnation/carbonization to fill the pores of the composite with carbon. If a thermosetting resin (phenolic) or other compound is utilized, the carbonized disc is impregnated followed by curing and charring, and then the steps of impregnation, curing and charring are repeated until the desired disc is provided. If pitch in the form of coal tar or petroleum is utilized, then the pitch is melted and impregnated into the disc followed by charring. The charring may be effected under pressure. Whichever of the steps is utilized (CVD, thermosetting resin, pitch), the resulting carbon-carbon brake disc contains a damping insert member which is an integral part of the disc structure.

It is proposed to utilize the present invention in molded, laminated fabric composites. In this method of providing a carbon composite aircraft brake disc, the disc is prepared by incorporating damping insert member(s) into molded, laminated woven or nonwoven fabric constructions (layer-on-layer of carbon cloth/phenolic prepreg) in a manner similar to the above example. The impregnated fabric material is heated to a low temperature of less than 200° C. to remove volatiles. Instead of utilizing molding compound, the carbon cloth/phenolic prepreg of fabric material in the form of annular rings or ring segments is used to prepare the preform. When a first portion or half of the prepreg cloth or fabric is added to the preform die, the damping insert member is added, followed by the remainder of the prepreg. The preform is then formed, followed by disc molding and carbon-carbon processing as above. Carbonization is typically at 800°-1100° C., and final heat treat is at 1600-2800° C., followed by machining. The resulting brake disc will contain the damping insert as an integral part of the disc structure.

A third proposed method of providing a brake disc with the damping insert member of the present invention comprises the utilization of nonwoven laminated fabric composites. Nonwoven laminated fabric preforms are prepared from multi-layers of random and/or oriented mats which are reinforced in the through-thickness direction by textile processes such as needling, sewing or tufting. The resulting preforms have multidirectional reinforcement and are used as the precursor for subsequent processing into carbon-carbon composites. In the preparation of such preforms for use in manufacturing carbon composite brake discs, it is possible to produce preforms in the general shape of the brake discs being manufactured. During the "build-up" of the preform, it is possible to incorporate a damping insert member(s) into the center of the preform by substituting a material such as Grafoil for annular ring(s) or segment(s) of the preform. As with the previous two examples, the damping insert member must have a smaller outer diameter and a larger inner diameter than the preform. The needling or other methods of achieving through-thickness reinforcement will penetrate the damping insert member and should provide damping effectiveness. The nonwoven laminated fabric preform can be subjected to carbon-carbon processing as discussed above. The interconnected layers or mats and damping insert member may receive a final heat treat of 1600°-2800° C. followed by machining. The resulting carbon-carbon brake disc will contain the damping insert as an integral part of the disc structure.

Figure 12:
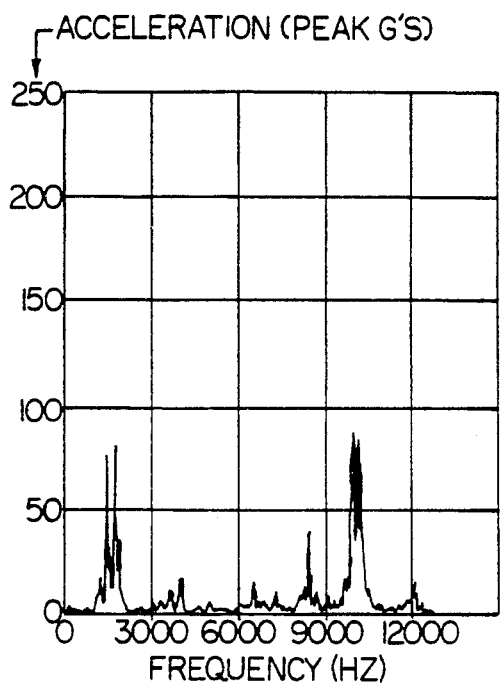
FIG. 12 is a graph illustrating undesirable vibration of an aircraft brake having carbon composite brake discs experiencing negative damping.
Figure 13:
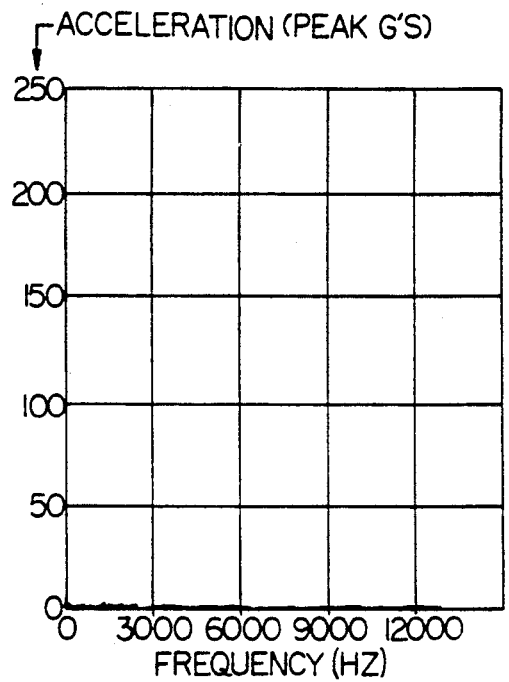
FIG. 13 is a graph illustrating the effects of positive damping in an aircraft brake having carbon composite brake discs made in accordance with the present invention.

Carbon composite brake discs were prepared in accordance with the first example and were processed into finished carbon discs that were subjected to both dynamic structural tests and vibration characterization tests. These brake discs each had an annular shaped damping insert member of Grafoil ® as illustrated in FIG. 2. The results of the dynamic structural tests demonstrated that composite discs with damping insert members are able to maintain structural integrity to the same degree as composite discs without damping insert members. FIG. 12 is a graphic illustration of undesirable vibration comprising brake "squeal" present in a prior aircraft brake having carbon composite brake discs not made in accordance with the present invention. The aircraft brake was run through multiple cold taxi (40 mph-0), landing, and hot taxi (40 mph-5 mph) stops. FIG. 12 illustrates the vibration experienced by the brake system (in terms of acceleration in G (gravitational) force) during the multiple series of cold taxi, landing, and hot taxi stops. The vibration or squeal of the aircraft brake was significant. FIG. 13 is a graphic illustration of an aircraft brake having carbon composite brake discs including damping insert members in accordance with the first example above. The graph illustrates vibration characterization tests conducted on a full scale brake in a laboratory. A similar regimen of multiple cold taxi (40 mph-0), landing, and hot taxi (40 mph-5 mph) stops was conducted on the brakes to determine the presence and magnitude of brake squeal type vibrations within the brake system. The graph illustrates that all vibrations over the frequency range tested are essentially eliminated as compared to the baseline brake characteristics illustrated in FIG. 12. In the test covered by this characterization, vibration was essentially eliminated when all stators and rotors in the brake containing the damping inserts. The same results were obtained when only the stators contained the damping inserts. It may be possible to further reduce the number of discs containing damping inserts so that only a minimal number of disc(s) with insert(s) is required to eliminate vibrations comprising brake squeal within the brake.

Figure 14:
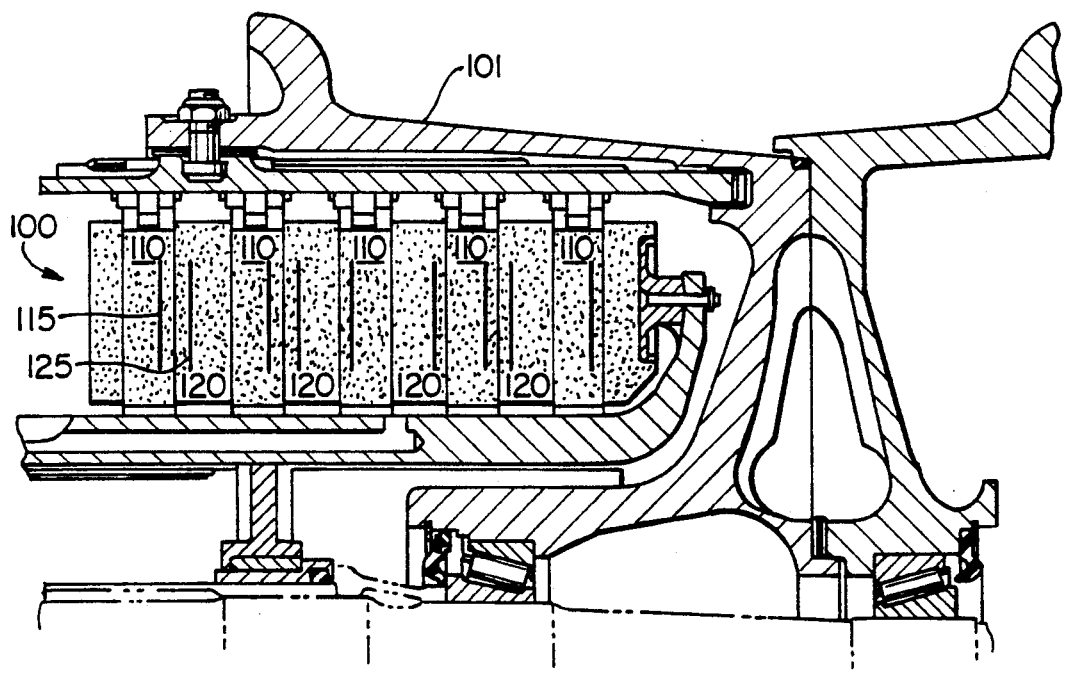
FIG. 14 is an illustration of an aircraft brake utilizing therein the present invention.

Discs utilizing a damping insert member in accordance with the present invention may be utilized within many different types of friction mechanisms. For example, the discs disclosed above comprise carbon-carbon composite brake discs utilized in aircraft brakes. Such discs also could be utilized in clutches or any number of friction mechanisms wherein the movement of one member is controlled by engagement with an adjacent member or members. FIG. 14 illustrates a typical aircraft brake 100 disposed within a wheel 101 wherein a plurality of carbon composite rotors 110 are disposed adjacent carbon composite brake stators 120. Rotors 110 include damping insert members 115 and stators 120 include damping insert members 125. The damping insert members may, as disclosed above, be located on or offset from the diametral center line of each respective disc, and located relative to the damping insert member of an adjacent disc in numerous configurations such as those illustrated in FIG. 14.

We claim:

1. A disc for a friction mechanism including a brake or clutch, the disc having parallel faces for engagement with opposing faces of associated friction mechanism members, said disc comprising a single integral disc member made of carbon composite friction material which includes an internal insert member disposed completely internally of said disc member, the insert member effecting positive vibration damping of the disc member during operation of said friction mechanism.

2. The disc in accordance with claim 1, wherein the insert member consisting of one of a graphite material, paper, and cloth.

3. The disc in accordance with claim 1, wherein said insert member provides a discontinuity within the carbon composite friction material in order to effect said positive vibration damping.

4. The disc in accordance with claim 1, wherein said insert member comprises a generally annular-shaped member.

5. The disc in accordance with claim 4, wherein said annular-shaped member includes therein a plurality of openings through which extends said carbon composite friction material.

6. The disc in accordance with claim 5, wherein said openings are in the shape of circles.

7. The disc in accordance with claim 6, wherein the circles comprise two radially spaced-apart rings of circles.

8. The disc in accordance with claim 7, wherein the circles of the respective rings comprise an outer radial annulus of circles and an inner radial annulus of circles, with the circles of the one ring being circumferentially nonaligned with the circles of the other ring.

9. The disc in accordance with claim 5, wherein said openings are in the shape of arcuate segments.

10. The disc in accordance with claim 5, wherein the openings comprise an annular ring of diamond-shaped openings.

11. The disc in accordance with claim 5, wherein the openings comprise a plurality of radially spaced-apart annular rings of diamond-shaped openings.

12. The disc in accordance with claim 5, wherein said generally annular-shaped insert member includes an irregular-shaped perimeter and includes therein circumferentially spaced-apart circular openings.

13. The disc in accordance with claim 12, wherein the openings comprise diamond-shaped openings.

14. The disc in accordance with claim 1, wherein the insert member is disposed along the diametral center line of said disc.

15. The disc in accordance with claim 1, wherein said insert member is located offset from the diametral center line of said disc.

16. The disc in accordance with claim 1, wherein the friction mechanism comprises an aircraft brake, and said disc comprises one of a stator and a rotor of said aircraft brake.

17. The disc in accordance with claim 1, wherein the insert member comprises a shredded member.

18. A method for providing an integral carbon-carbon composite brake component having carbon material disposed about an internal damping insert member, comprising the steps of molding a mixture of chopped carbon fiber, thermosetting resin, and a damping insert member into the shape of a brake component, heating the molded mixture in order to convert the thermosetting resin to glassy carbon, densifying the carbon material in order to reduce porosity thereof by depositing additional carbon therein, heating the carbon material to a temperature range of 1600°-2800° C., and machining the carbon material to the final dimensions of the brake component, the insert member effecting positive damping of the brake component to minimize dynamic vibrations.

19. The method in accordance with claim 18, wherein the heating to convert the resin to glassy carbon occurs within the temperature range of 500°-1100° C.

20. The method in accordance with claim 18, wherein the densification of the carbon material comprises a liquid resin/pitch impregnation followed by heating to a temperature in the range of 500°-1100° C.

21. The method in accordance with claim 18, wherein the insert member consists of one of a graphite material, paper, and cloth.

22. The method in accordance with claim 18, wherein said insert member includes therein a plurality of openings through which extends said carbon composite friction material.

23. The method in accordance with claim 18, wherein the insert member comprises a shredded member.

24. A method for providing an integral carbon/carbon composite brake component having carbon material disposed about a damping insert member, comprising the steps of impregnating a carbon fabric material in a resin bath, heating the fabric material to a low temperature of less than 200° C. in order to remove volatiles therefrom and to provide a prepreg, forming layers of the prepeg and the damping insert member to a desired shape, molding the layers and member under pressure and heat to form a carbon fabric brake material, heating the carbon fabric brake material to a temperature of at least 800° C. to produce a porous substrate with a glassy carbon matrix, densifying the porous substrate in order to reduce porosity and add additional carbon thereto, heat treating the resulting composite to a temperature in the range of 1600°-2800° C., and machining the composite to dimension to provide the carbon brake component, the insert member effecting positive damping of the brake component to minimize dynamic vibrations.

25. The method in accordance with claim 24, wherein the insert member consists of one of a graphite material, paper, and cloth.

26. The method in accordance with claim 24, wherein said insert member includes therein a plurality of openings through which extends said carbon composite friction material.

27. The method in accordance with claim 24, wherein the insert member comprises a shredded member.

28. A method of providing an integral carbon-carbon composite brake component having a carbon material disposed about a damping insert member, comprising the steps of placing a plurality of carbon fiber layers about a layer comprising the damping insert member, reinforcing the layers by one of needling, sewing or tufting to provide a preform, densifying the preform in order to reduce porosity and add additional carbon thereto, heat treating the resulting composite to a temperature in the range of 1600°-2800° C., and machining the composite to dimension to provide the composite brake component, the insert member effecting positive damping of the brake component to minimize dynamic vibrations.

29. The method in accordance with claim 28, wherein the insert member consists of one of a graphite material, paper, and cloth.

30. The method in accordance with claim 28, wherein said insert member includes therein a plurality of openings through which extends said carbon composite friction material.

31. The method in accordance with claim 28, wherein the insert member comprises a shredded member.

32. A friction mechanism including a brake or clutch having spaced-apart nonrotatable discs, rotatable discs positioned adjacent said nonrotatable discs for friction engagement with said nonrotatable discs, at least one disc comprising an integral disc member made of carbon composite friction material which includes an internal insert member disposed completely within said disc member, the insert member effecting positive damping of the disc member during dynamic operation of said friction mechanism.

33. The friction member in accordance with claim 32, wherein the insert member consists of one of a graphite material, paper, and cloth.

34. The friction member in accordance with claim 33, wherein said insert member includes therein a plurality of openings through which extends said carbon composite friction material.

35. The friction member in accordance with claim 34, wherein said insert member includes an irregular-shaped perimeter and includes therein circumferentially spaced-apart circular openings.

36. The friction member in accordance with claim 32, wherein the friction mechanism comprises an aircraft brake, and said disc comprises one of a stator and a rotor of said aircraft brake.

37. The friction member in accordance with claim 32, wherein the insert member comprises a shredded member.

38. The friction member in accordance with claim 37, wherein the shredded member is disposed within the disc member in the form of multiple pieces thereof.

* * * * *